(12) United States Patent
Koehl

(10) Patent No.: US 12,391,496 B2
(45) Date of Patent: *Aug. 19, 2025

(54) UNLOADING CONVEYOR SYSTEMS, METHODS AND APPARATUS

(71) Applicant: WM. D. SCEPANIAK INC., Holdingford, MN (US)

(72) Inventor: Tom Koehl, Morris, MN (US)

(73) Assignee: WM. D. SCEPANIAK INC., Holdingford, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,927

(22) Filed: Apr. 1, 2024

(65) Prior Publication Data
US 2024/0239620 A1 Jul. 18, 2024

Related U.S. Application Data

(63) Continuation of application No. 17/003,963, filed on Aug. 26, 2020, now Pat. No. 11,975,930.

(60) Provisional application No. 62/979,220, filed on Feb. 20, 2020, provisional application No. 62/891,744, filed on Aug. 26, 2019.

(51) Int. Cl.
*B65G 69/28* (2006.01)
*B65G 67/32* (2006.01)

(52) U.S. Cl.
CPC .......... *B65G 69/2811* (2013.01); *B65G 67/32* (2013.01); *B65G 2814/0326* (2013.01)

(58) Field of Classification Search
CPC ................ B65G 69/2811; B65G 67/32; B65G 2814/0326; B65G 69/2823; B65G 69/30
See application file for complete search history.

(56) References Cited

U.S. PATENT DOCUMENTS

| | | | | |
|---|---|---|---|---|
| 3,866,889 A * | 2/1975 | Maxon, III | ........... | B28C 5/4244 366/27 |
| 4,925,356 A * | 5/1990 | Snead | ...................... | E01B 27/02 414/528 |
| 7,090,066 B2 * | 8/2006 | Kirsch | .................... | B65G 47/18 414/572 |
| 10,457,486 B1 * | 10/2019 | Ulmer | ..................... | B60P 1/435 |
| 10,584,003 B2 * | 3/2020 | Friesen | .................. | B65G 47/44 |
| 2007/0089966 A1 * | 4/2007 | Gausman | ............... | B65G 47/18 198/311 |
| 2011/0174907 A1 * | 7/2011 | Davis | ...................... | B02C 23/02 241/222 |
| 2016/0052732 A1 * | 2/2016 | Toews | .................... | B65G 67/24 198/302 |
| 2017/0130808 A1 * | 5/2017 | Pham | ........................ | E04H 7/22 |

* cited by examiner

*Primary Examiner* — Abigail A Risic
(74) *Attorney, Agent, or Firm* — Best & Flanagan LLP

(57) ABSTRACT

A side-dump truck containing aggregate material can be driven over a ramp assembly for unloading. Aggregate material from the side-dump truck is deposited laterally to a side conveyor system, which has a first side conveyor and a second side conveyor pivotable from the conveying configuration to a transport configuration. The aggregate material is conveyed by the side conveyor system being in the conveying configuration to an unloading conveyor system, which has a first unloading conveyor at least partially beneath the side conveyor system.

10 Claims, 17 Drawing Sheets

UNLOADING CONVEYOR SYSTEMS, METHODS AND APPARATUS

CROSS-REFERENCE TO RELATED APPLICATIONS

The present disclosure is a continuation application of U.S. application Ser. No. 17/003,963, filed on Aug. 26, 2020, which claims priority to Provisional Application No. 62/979,220, filed Feb. 20, 2020, and which claims priority to Provisional Application No. 62/891,744, filed Aug. 26, 2019, entitled "Unloading Conveyor Systems, Methods and Apparatus", the contents of which are hereby incorporated by reference herein in their entirety.

BACKGROUND

Unloading conveyors and unloading conveyor systems are used to unload material such as aggregate material, e.g., from trailers, trucks, rail cars, etc.

DESCRIPTION

Figure 1:
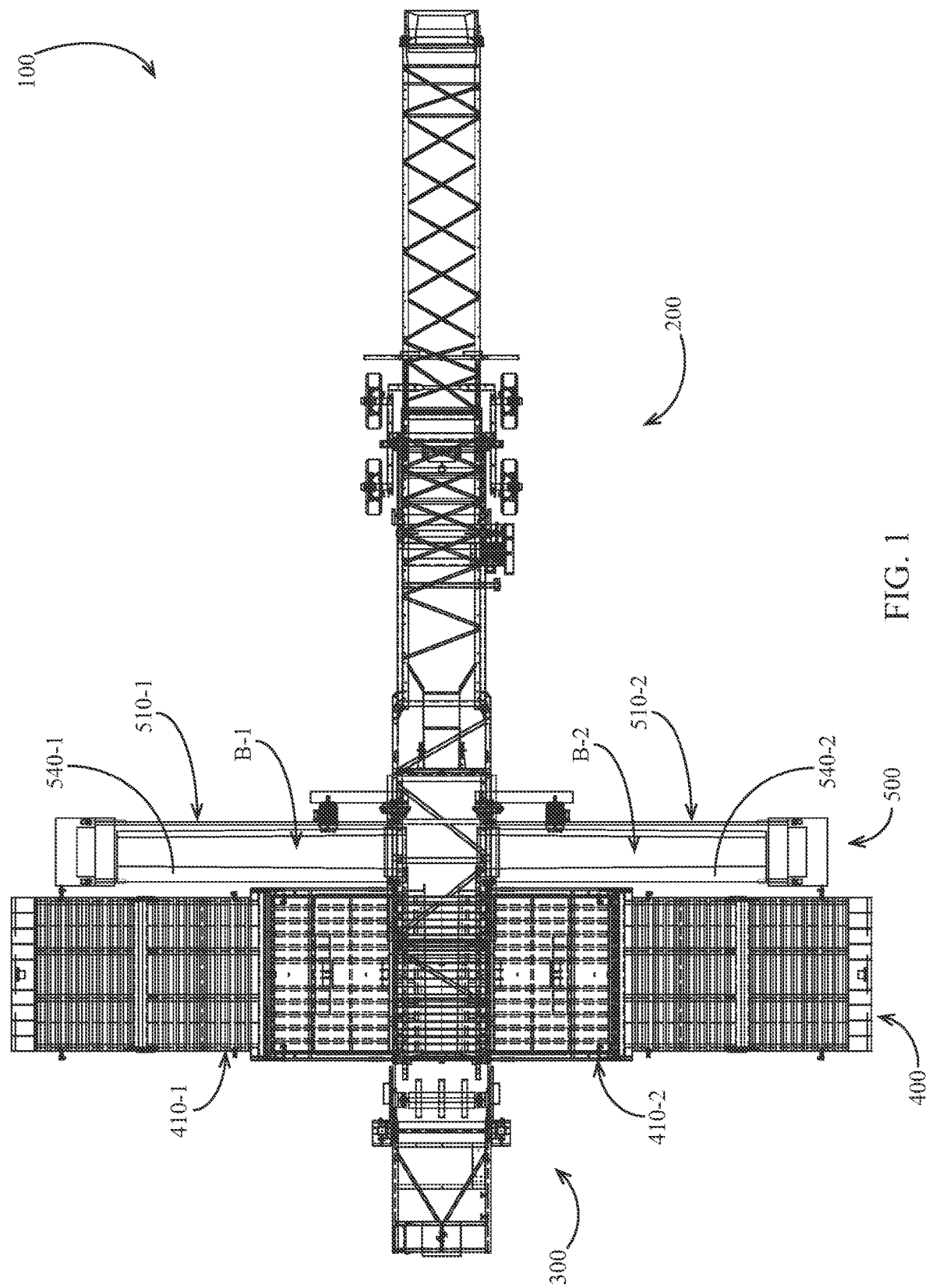
FIG. 1 is a top view of an unloading conveyor system in an operational configuration.
Figure 2:
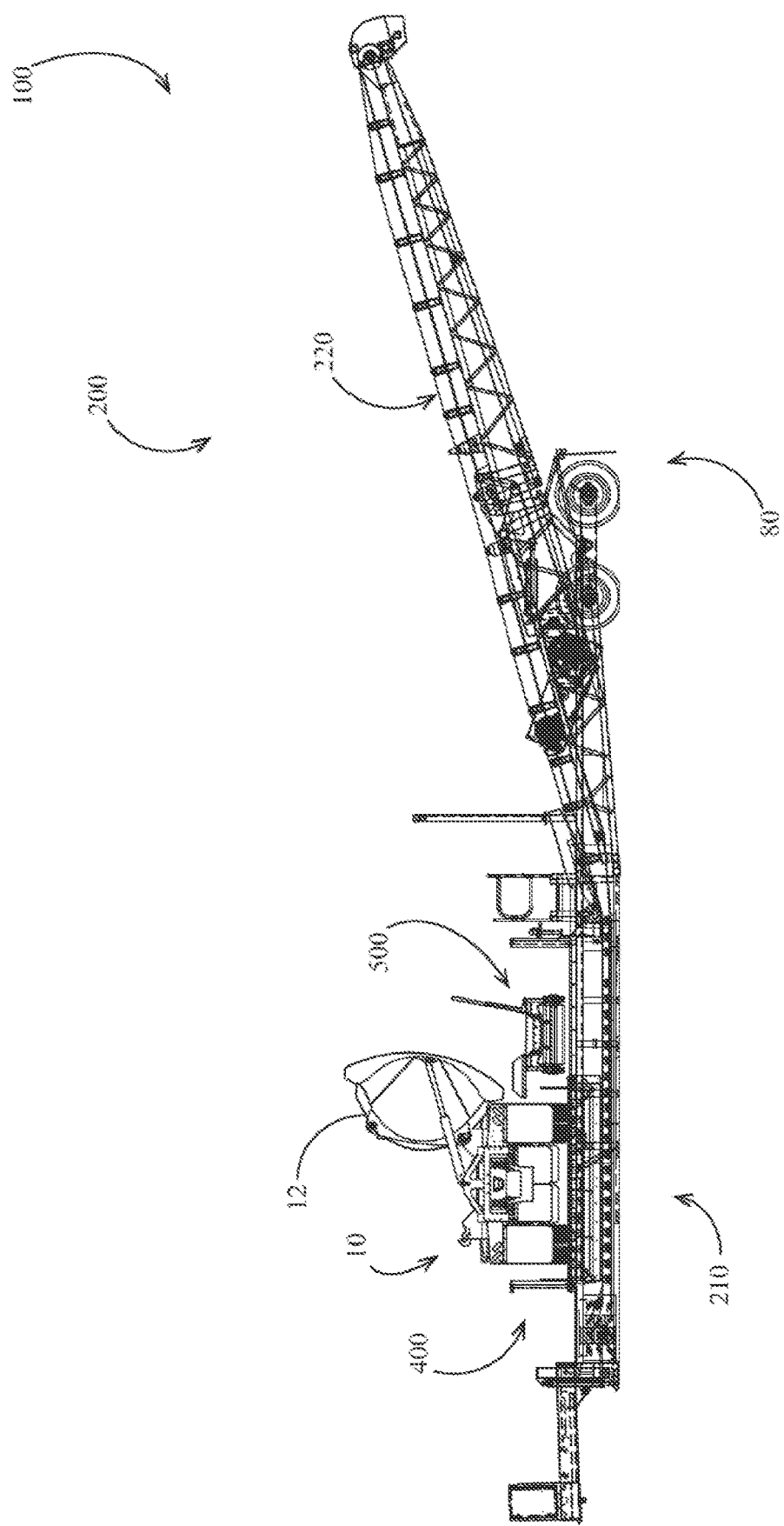
FIG. 2 is a side elevation view of the unloading conveyor system of FIG. 1 in an operational configuration.

Referring to the drawings, wherein like reference numerals designate identical or corresponding parts throughout the several views, FIG. 1 illustrates an unloading conveyor system 100 in an operational configuration. In some embodiments, the unloading conveyor system 100 comprises a ramp assembly 400, a side conveyor system 500, and an unloading conveyor system 200. Referring to FIG. 2, the unloading conveyor system 200 optionally includes a first unloading conveyor 210 disposed at least partially beneath the side conveyor system 500. The unloading conveyor system 200 optionally includes a second unloading conveyor 220 which is optionally disposed to receive material from the first unloading conveyor 210; the second unloading conveyor 220 optionally extends upwardly and away from the first unloading conveyor 210 for unloading material at an elevated position. With reference to FIGS. 1 and 2, in operation the ramp assembly 400 optionally includes first and second ramps 410-1, 410-2 configured to support a vehicle 10, such as a side-dump truck having a side-dump container 12 configured to be unloaded to the side of the vehicle 10. In some embodiments, a grate or other support is positioned between ramps 410-1, 410-2 and configured to support the truck and/or allow aggregate material to fall therethrough. In operation, the side conveyor system optionally receives material (e.g., aggregate material) from the vehicle 10 and conveys the material to the first unloading conveyor 210.

Referring to FIG. 1, the side conveyor system 500 optionally includes two side conveyors 510-1, 510-2 extending transversely away from the unloading conveyor system 200. Each side conveyor 510 is optionally configured and disposed to convey material toward the first unloading conveyor 210 and optionally to deposit material (directly or indirectly) on the first unloading conveyor 210.

In some embodiments, the system 200 transportable (e.g., by towing). The system 200 optionally comprises rigid frame coupled to a towing eye or other structure for transport attachment. The system 200 is optionally supported on wheeled supports 80 or on tracks or other transport supports.

Figure 3:
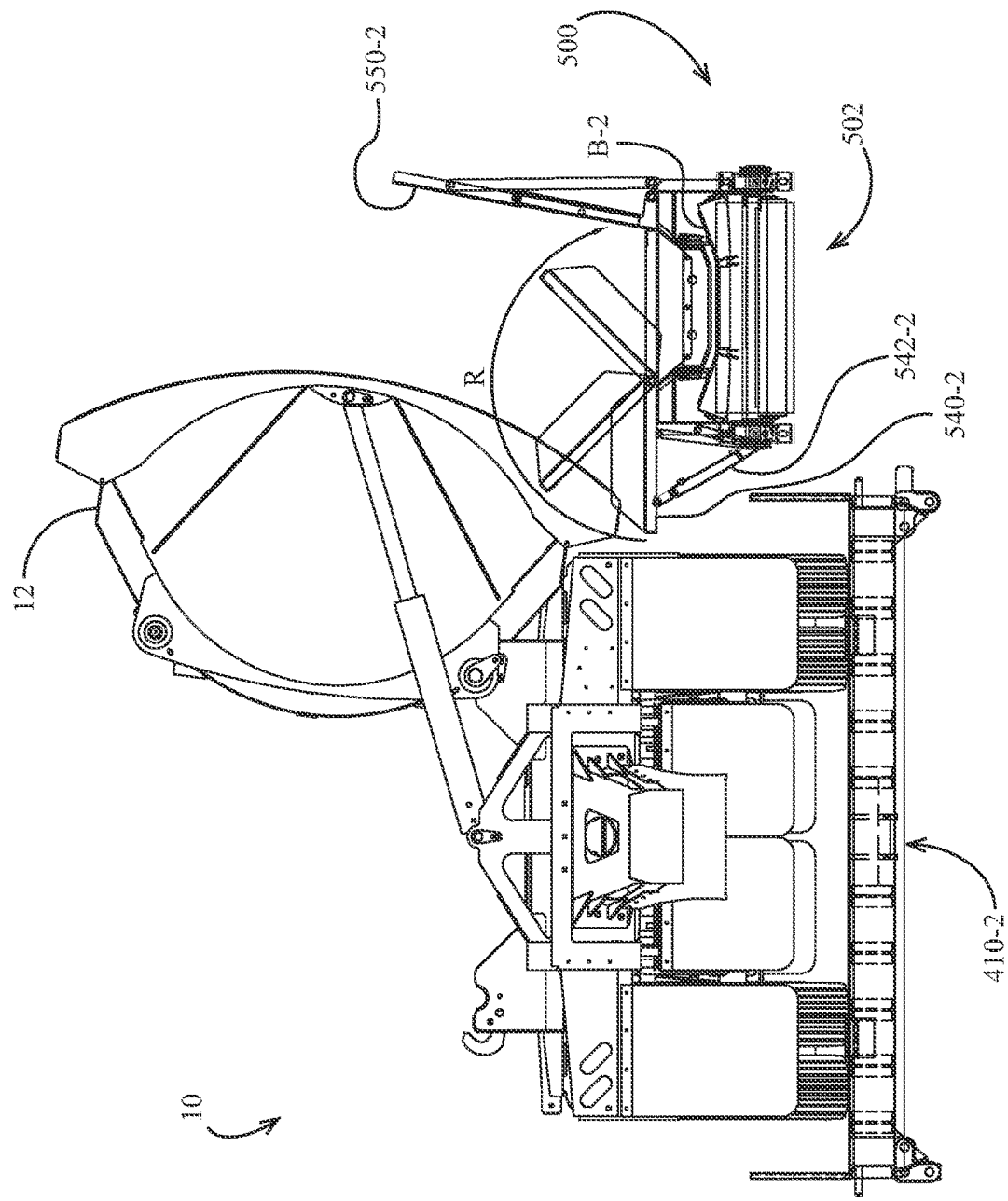
FIG. 3 is an expanded side elevation view of the unloading conveyor system of FIG. 1 in an operational configuration.
Figure 4:
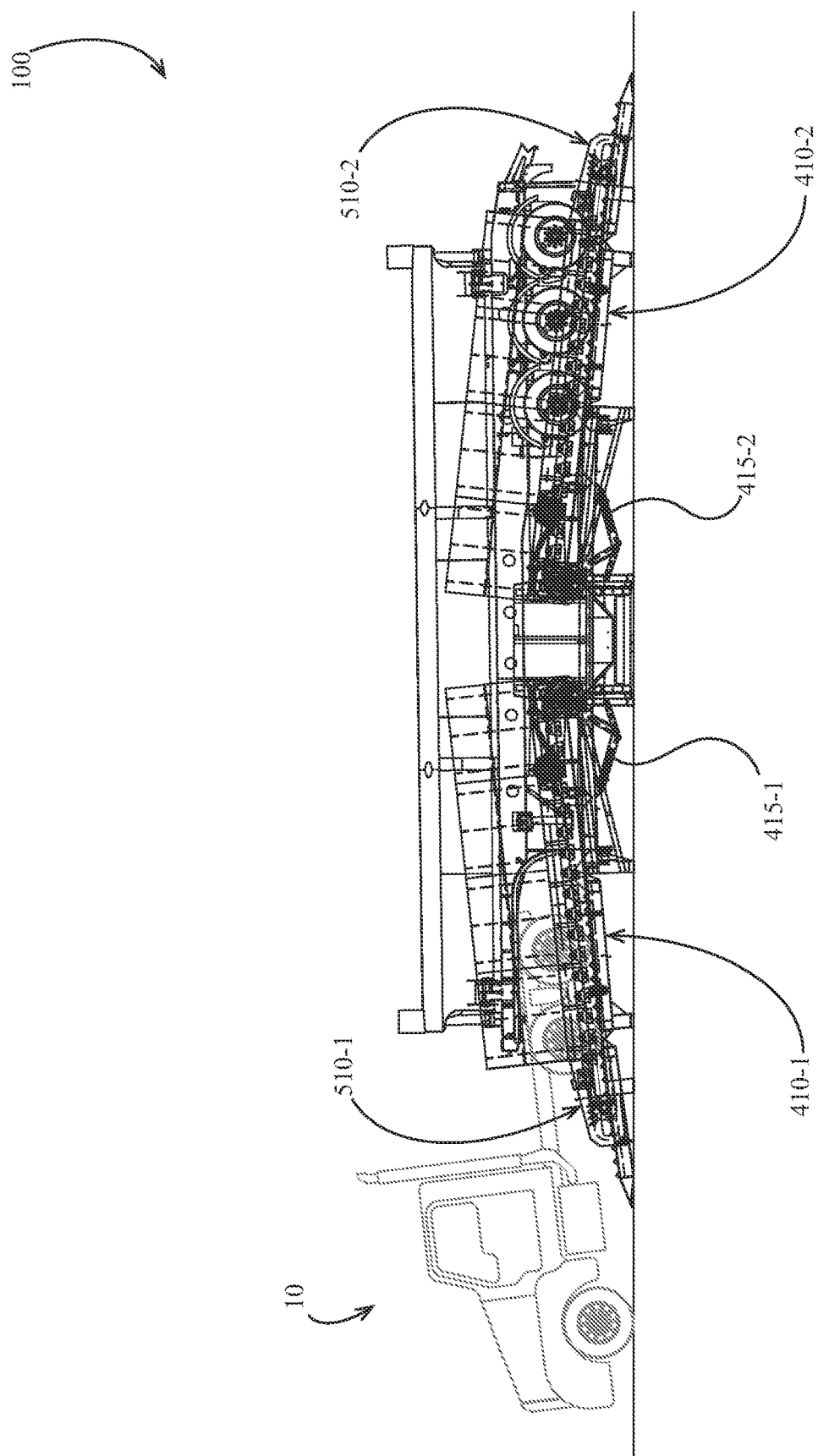
FIG. 4 is a rear view of the unloading conveyor system of FIG. 1 in an operational configuration.

Referring additionally to FIG. 3, each side conveyor 510 optionally includes an extension wing 540 and a backboard 550. In operation, at least some material dumped generally toward the side conveyor 510 from the container 12 is optionally guided to a conveyor belt B of the side conveyor 510 by the extension wing 540 and/or backboard 550. The extension wing 540 is optionally pivotally mounted (e.g., for pivoting about a rotational direction R) to a frame 502 of the side conveyor 510. In some embodiments, an actuator 542 is configured to pivot the extension wing 540 for transport and/or for dumping remaining material onto the conveyor belt B. In some embodiments, the backboard 550 is reconfigurable (e.g., foldable) into a low-profile transport configuration and/or removable for transport.

Figure 5:
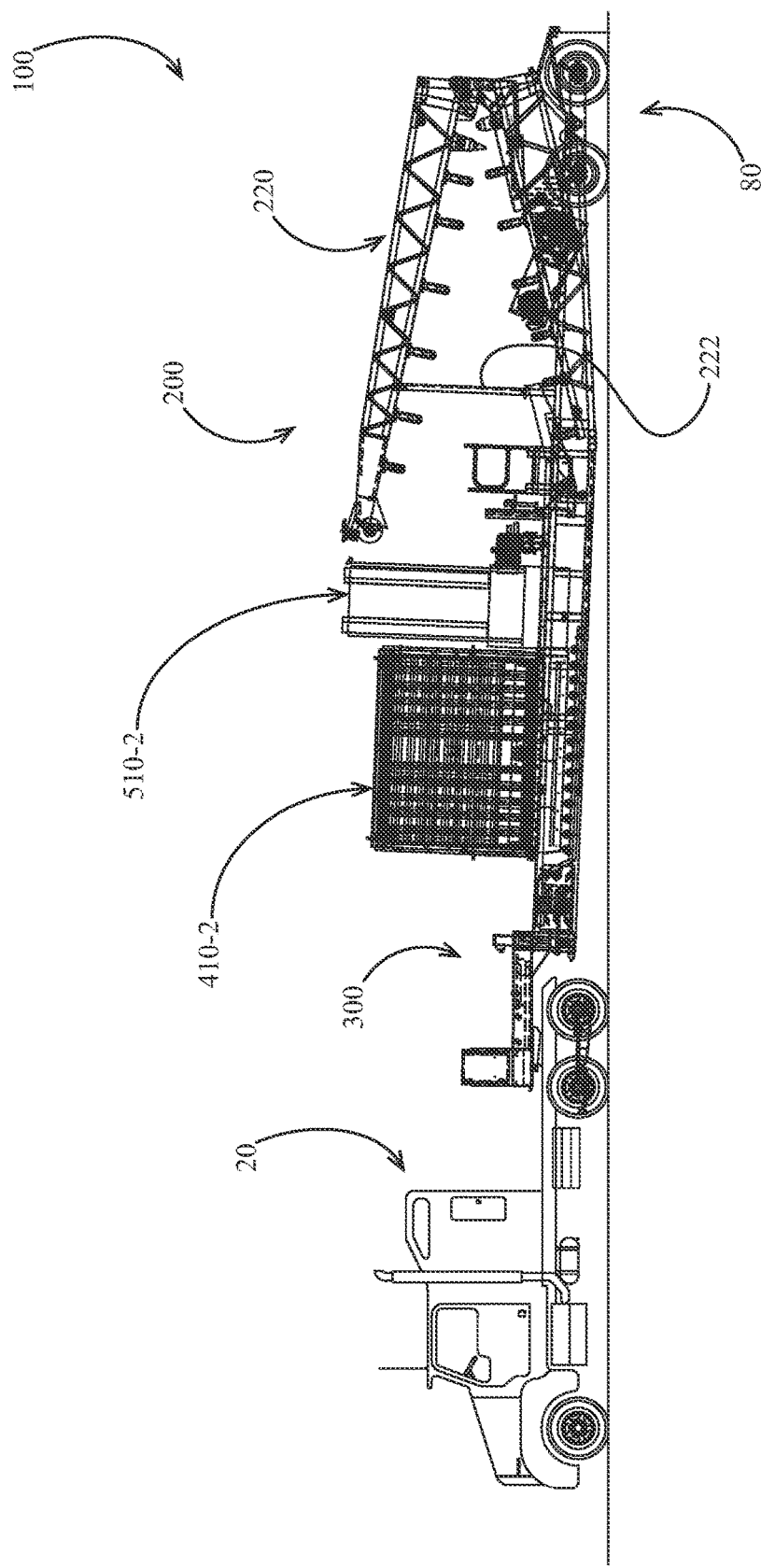
FIG. 5 is a side elevation view of the unloading conveyor system of FIG. 1 in a transport configuration.

Referring to FIG. 5, the conveyor system 100 is shown in a transport configuration. In some embodiments, a rearward end 300 of conveyor system 100 is operably supported for transport on a transport vehicle 20 such as a semi-truck or other tractor unit. In some embodiments, the second unloading conveyor 220 is reconfigurable (e.g., foldable) into a transport configuration having a reduced overall length (e.g., between approximately 20-80% of the overall length). In some embodiments, the ramp assembly 400 and/or side conveyor system 500 are reconfigurable (e.g., foldable) into transport configurations (e.g., those described in more detail below).

Figure 6:
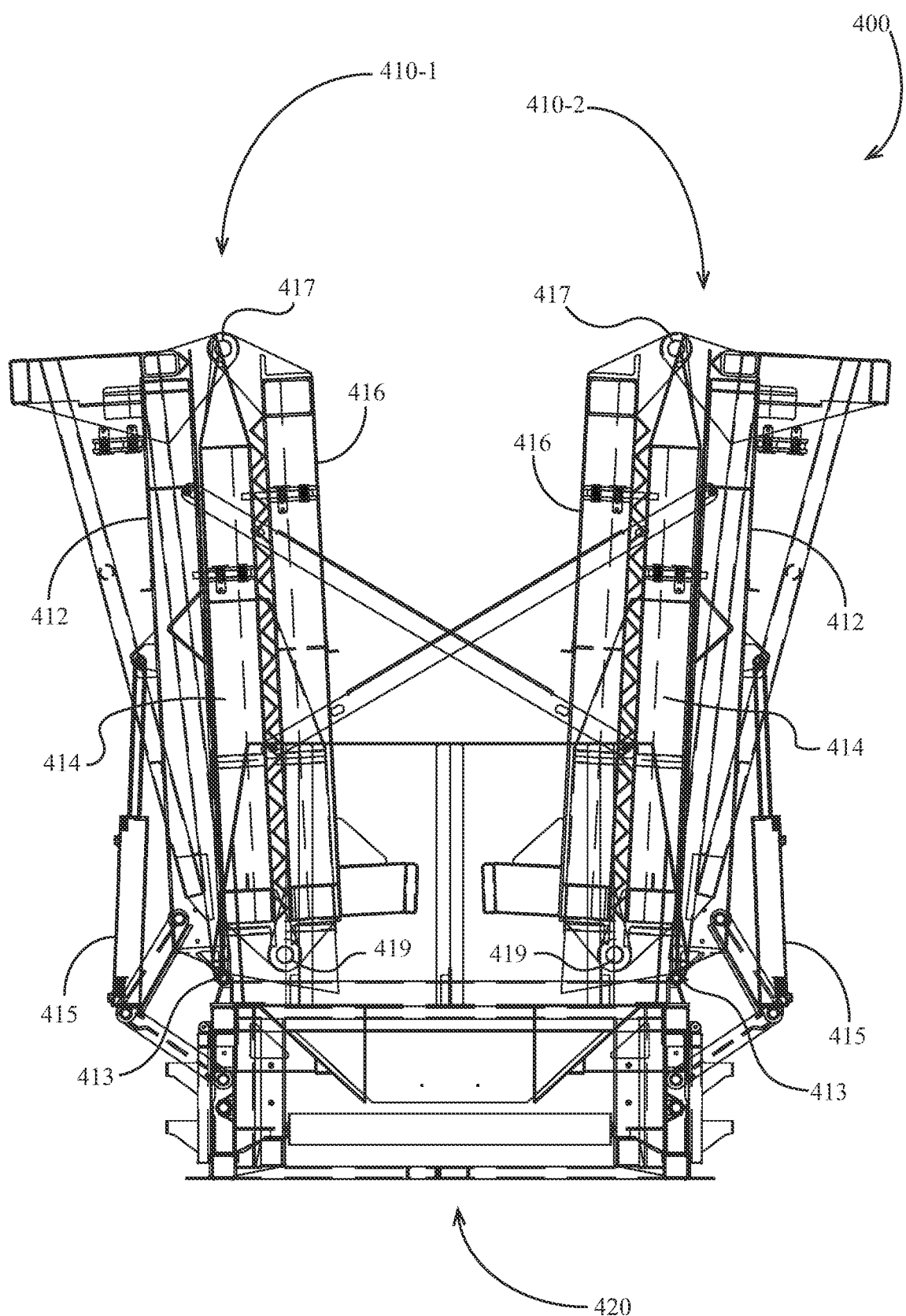
FIG. 6 is a rear elevation view of ramps of the unloading conveyor system of FIG. 1 in a transport configuration.

Referring to FIG. 6, each ramp 410 is optionally pivotally mounted (e.g., at a pivot 413) to a frame 420 (e.g., for pivoting about a generally horizontal axis). In some embodiments, an actuator 415 is configured to raise and lower each ramp 410. In some embodiments, each ramp 410 comprises a first ramp 412 (e.g., ramp section, ramp portion, portion of a ramp, length of ramp, etc.) pivotally coupled to a second ramp 416 (e.g., ramp section, ramp portion, portion of a ramp, length of ramp, etc.) by pivot 417. In some embodiments, each ramp 410 comprises a third ramp 414 (e.g., ramp section, ramp portion, portion of a ramp, length of ramp, etc.) pivotally coupled to the second ramp 416 by a pivot 419.

Figure 7:
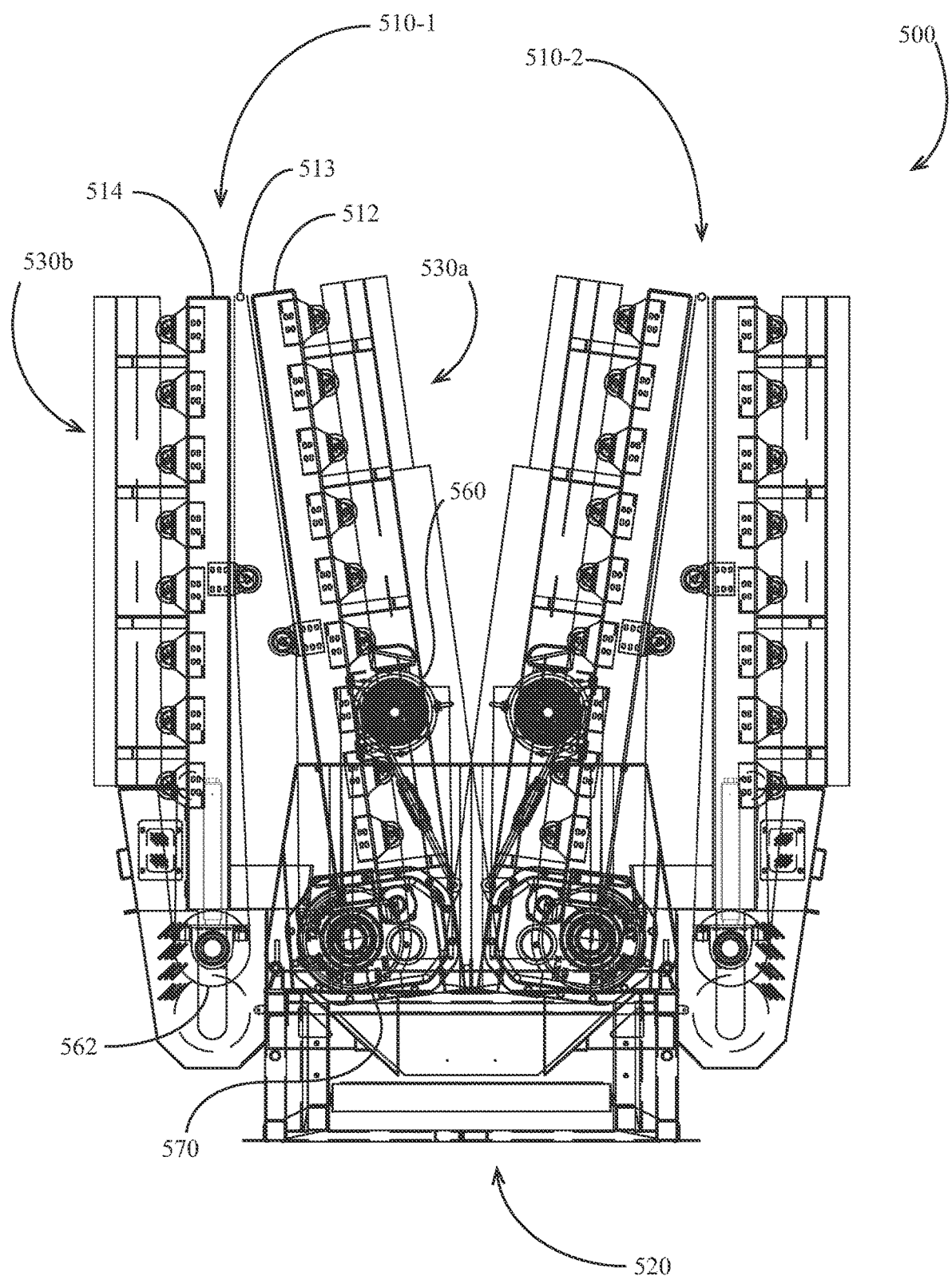
FIG. 7 is a rear elevation view of side conveyors of the unloading conveyor system of FIG. 1 in a transport configuration.

Referring to FIG. 7, the side conveyor system 500 is shown in a transport configuration. Each side conveyor 510 optionally includes two conveyor frames 512, 514 pivotally connected by a pivot 513. The conveyor frame 512 is optionally pivotally connected to a frame 520 by a pivot 570. The conveyor frames 512, 514 optionally support pluralities of conveyor idler assemblies 530a, 530b. The conveyor frame 512 optionally supports a pulley 560 (e.g., motor-driven head pulley). The conveyor frame 514 optionally supports a pulley 562 (e.g., tail pulley). Each side conveyor 510 (e.g., an inner end thereof) is optionally provided with one or more scrapers (not shown) for removing material from the conveyor belt (not shown) of the side conveyor. An actuator (not shown) associated with each side conveyor 510 optionally raises and lowers the conveyor frame 512 between the transport and operational configurations.

Figure 15:
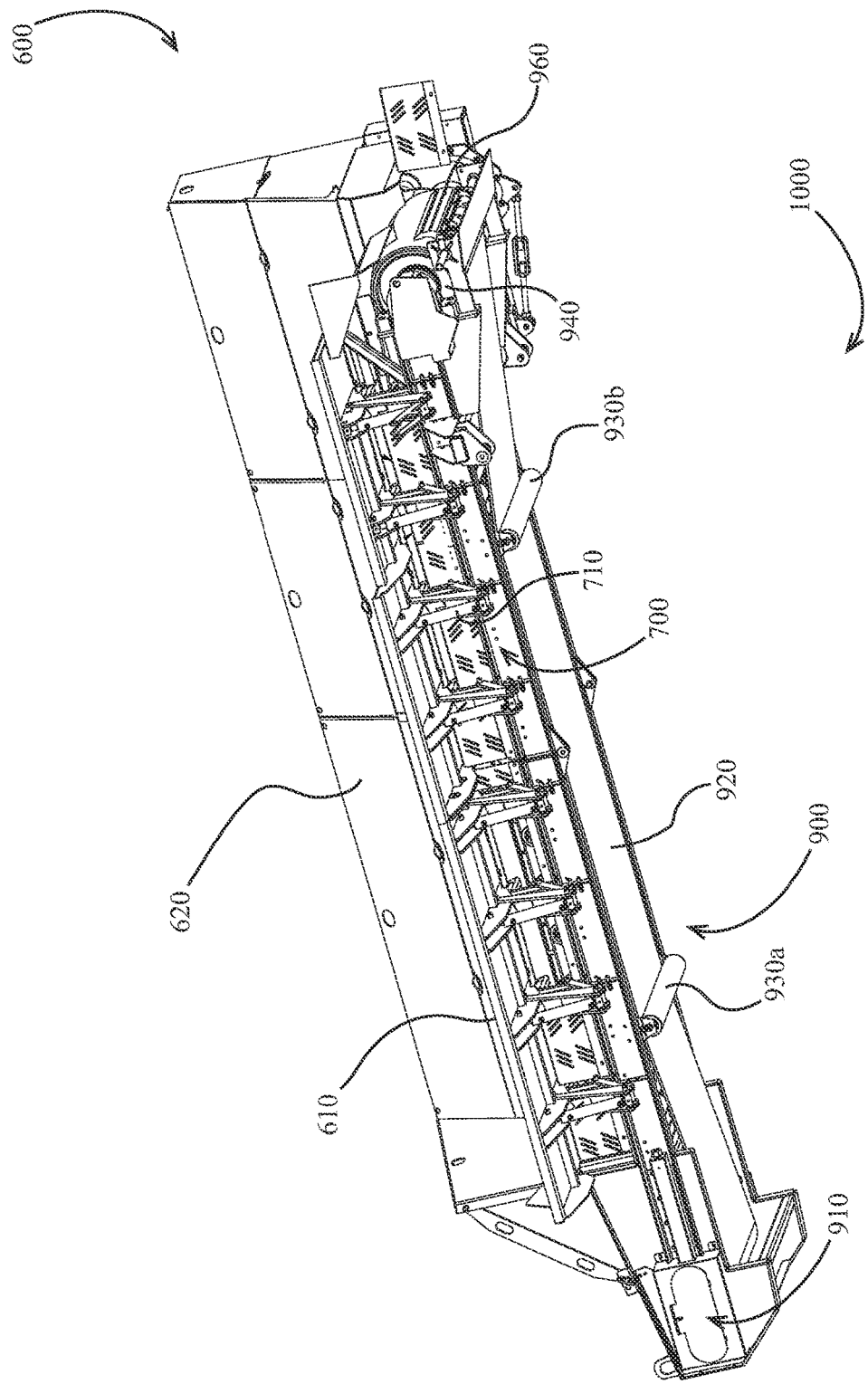
FIG. 15 is a perspective view of the side conveyor of FIG. 8 in an operational configuration with an embodiment of a belt conveyor assembly installed.
Figure 16:
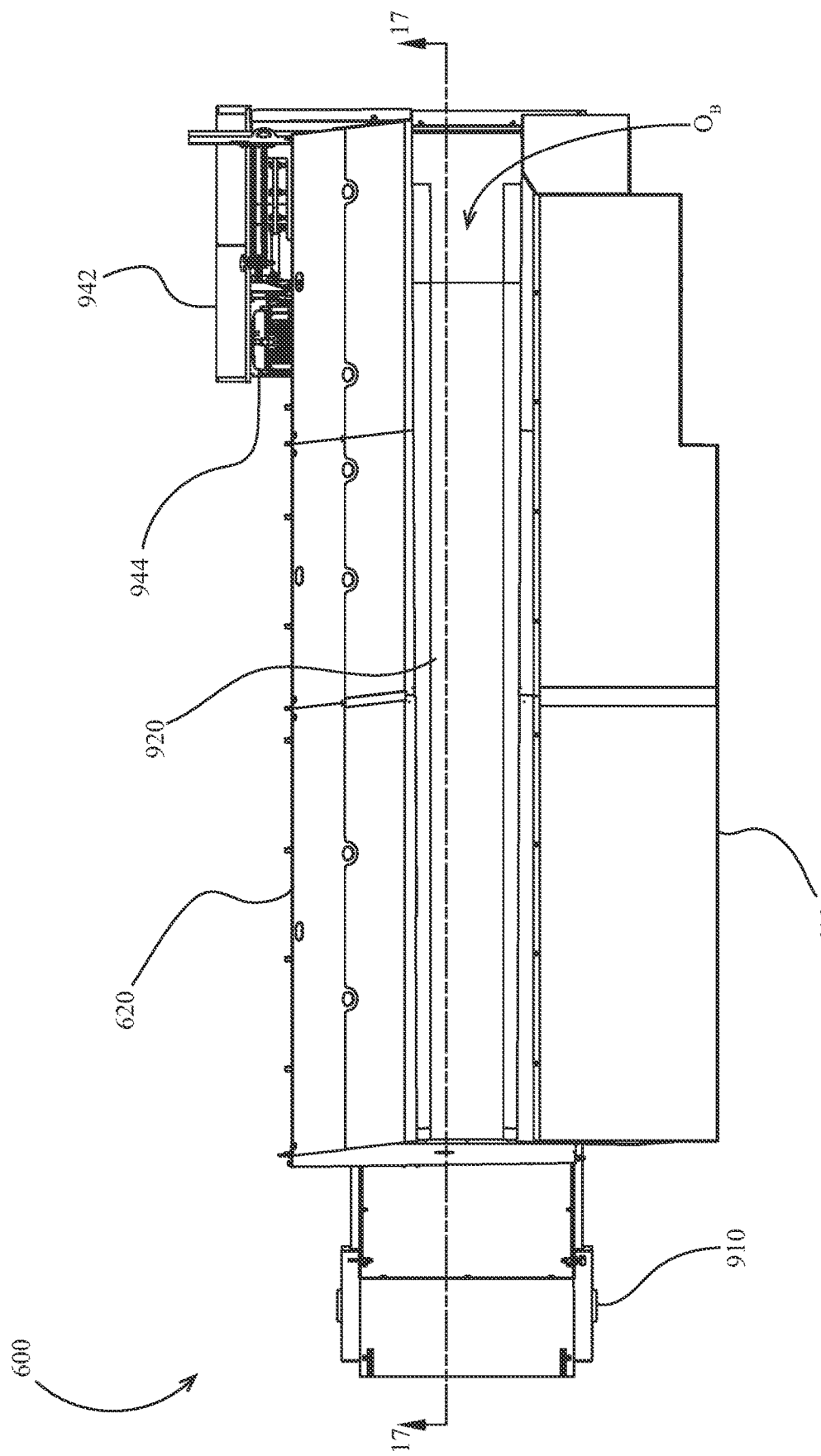
FIG. 16 is a plan view of the side conveyor of FIG. 8 in an operational configuration with an embodiment of a belt conveyor assembly installed.
Figure 17:
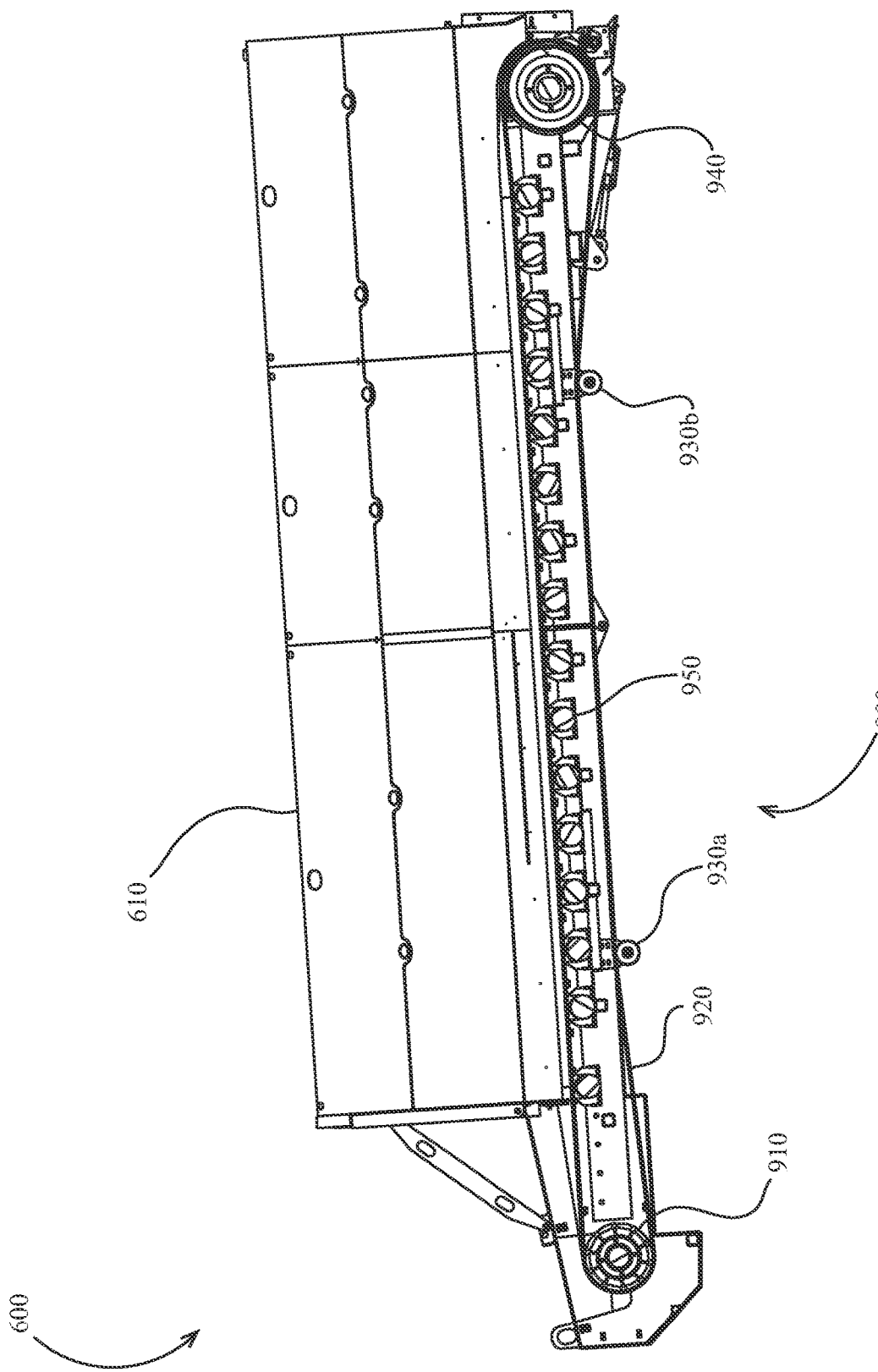
FIG. 17 is a sectional view along section 17-17 of FIG. 16.

Referring to FIGS. 8-14, another embodiment of a side conveyor 600 is illustrated with a belt assembly not shown. Referring to FIGS. 15-17, a side conveyor system 1000 is illustrated comprising side conveyor 600 with an embodiment of a belt assembly 900 operably installed on the side conveyor.

Figure 8:
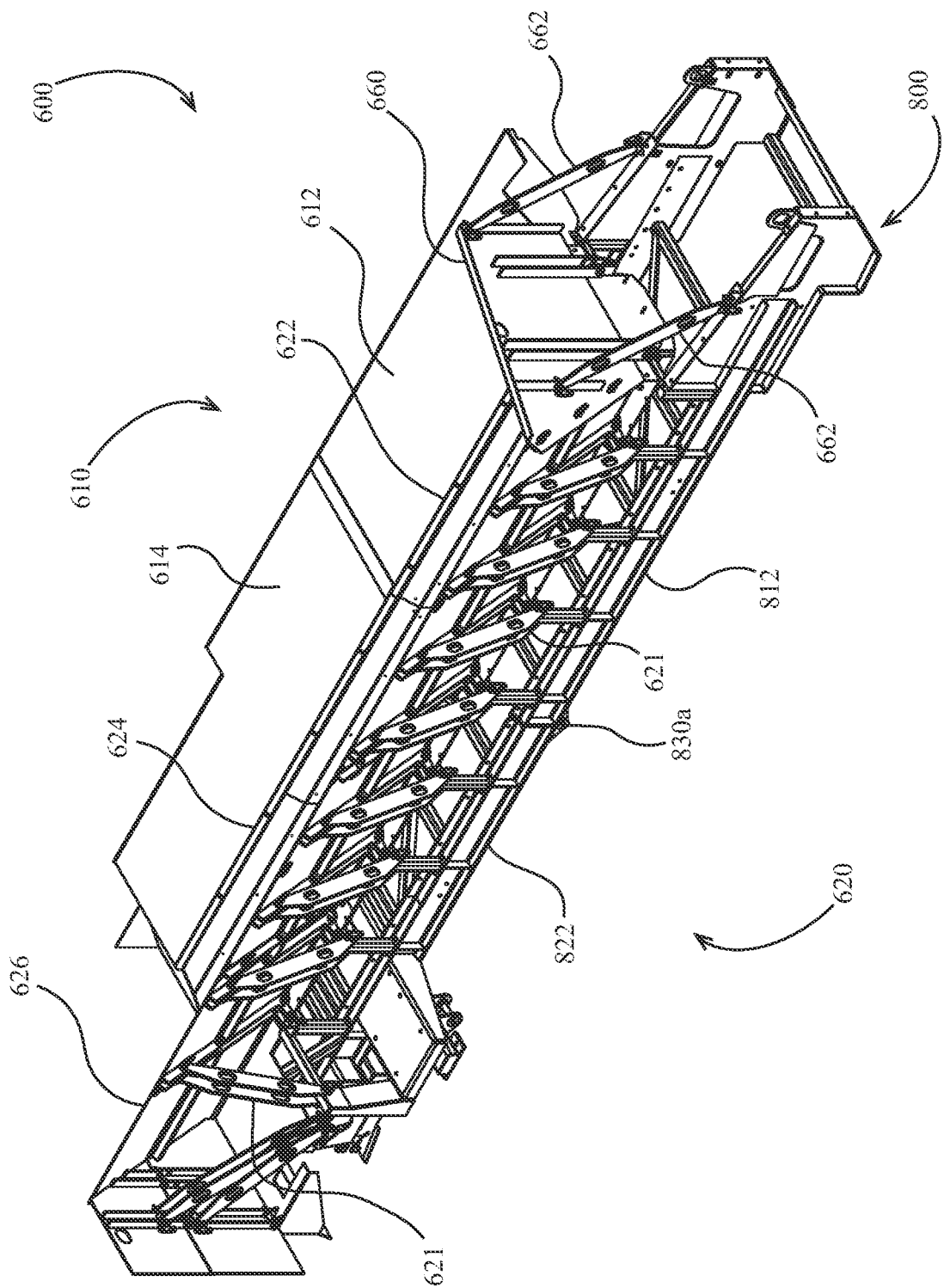
FIG. 8 is a perspective view of an embodiment of a side conveyor in an operating configuration.

Referring to FIG. 8, the side conveyor 600 is illustrated in an operational configuration in which a wing, backboard and/or end board are positioned to guide material onto a conveyor belt. The side conveyor optionally comprises a frame 800 and a wing extension 610 pivotally coupled to the frame. The wing extension 610 optionally comprises a plurality of wing extension sections (e.g., wing extension sections 612, 614), each of which is optionally pivotally coupled to the frame 800. A backboard 620 is optionally pivotally coupled to frame 800. The backboard 620 optionally comprises a plurality of backboard sections (e.g., backboard sections 622, 624, 626) which are each optionally pivotally coupled to the frame 800. Each backboard section is optionally supported in the operational configuration by one or more braces 621. The side conveyor 600 optionally comprises an end board 660 optionally pivotally coupled to frame 800. The end board 660 is optionally supported in the operational configuration by one or more braces 662.

Figure 9:
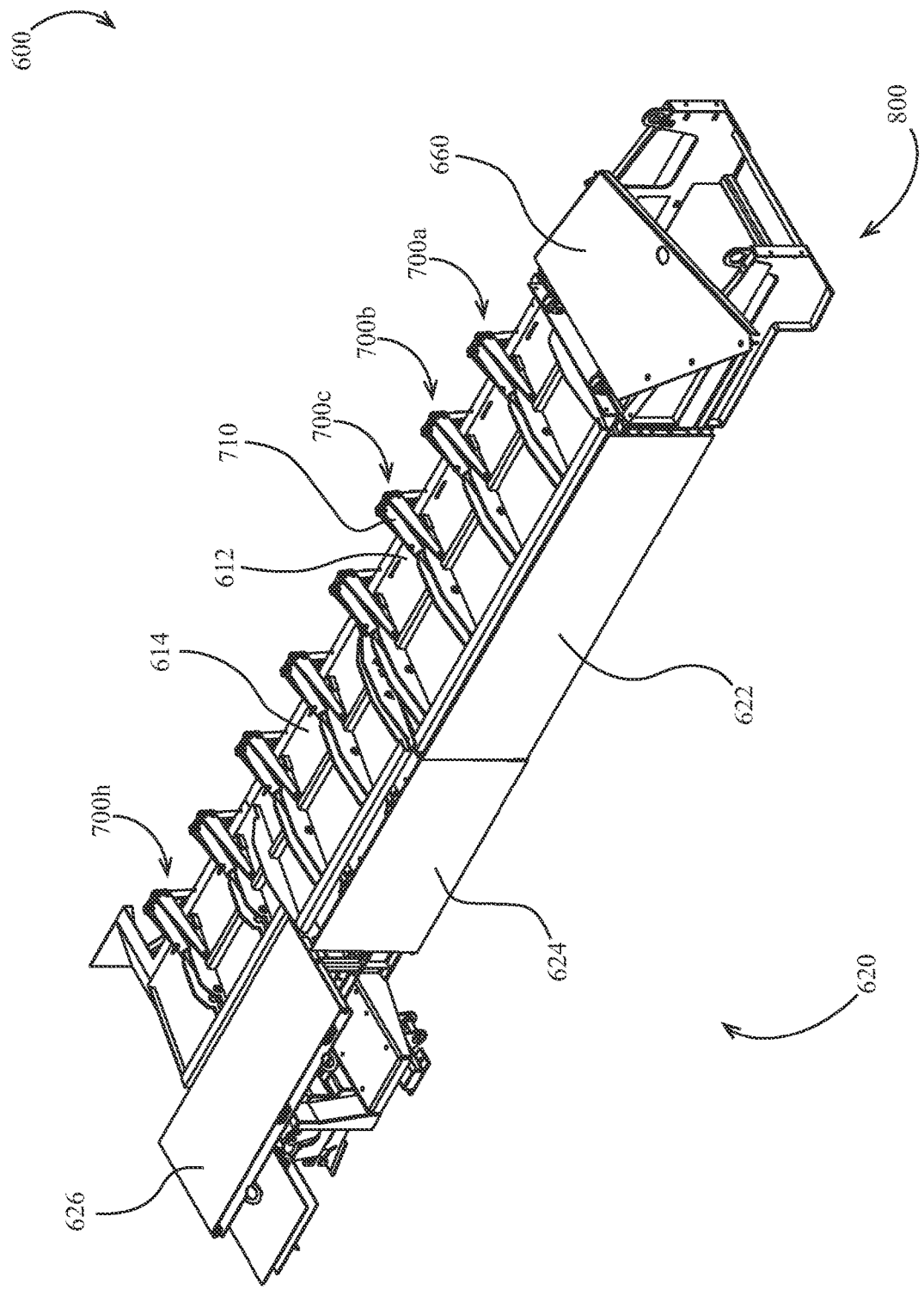
FIG. 9 is a perspective view of the side conveyor of FIG. 8 in an intermediate configuration.

Referring to FIG. 9, the side conveyor 600 is illustrated in an intermediate configuration in which the wing extension 610, backboard 620 and end board 660 are pivoted toward the frame 800. The wing extension 610 is optionally pivoted into the intermediate configuration by a plurality of linkages 700 operably coupling each wing extension 610 to the frame 800. Each linkage 700 optionally includes an actuator 710 (e.g., hydraulic actuator). In some embodiments, the linkage 700 supports the wing extension 610 in the operational configuration in a first state of the actuator 710 and in the intermediate configuration in a second state of the actuator 710; in some embodiments, the first state of actuator 710 is more retracted than the second state of actuator 710.

Figure 10:
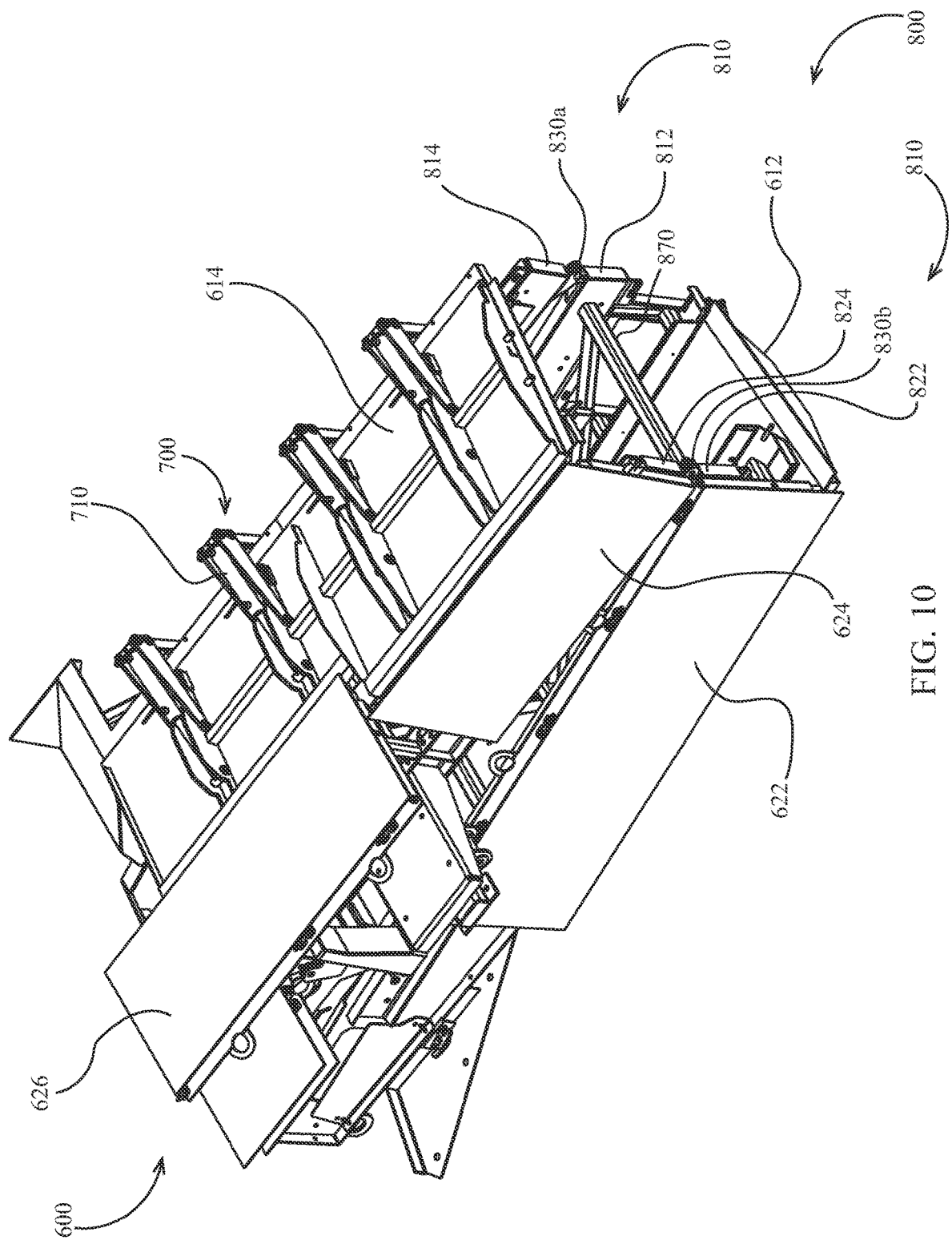
FIG. 10 is a perspective view of the side conveyor of FIG. 8 in a transport configuration.

Referring to FIG. 10, the side conveyor 600 is illustrated in a transport configuration in which the frame 800 is optionally folded. In some embodiments, the side conveyor 600 is optionally first reconfigured into the intermediate configuration prior to folding the frame 800 into the transport configuration. In some embodiments, the frame 800 comprises a first rail 810 to which the wing extension 610 is pivotally coupled and a second rail 820 to which the backboard 620 is pivotally coupled. The first rail 810 optionally comprises a first rail section 812 and a second rail section 814 pivotally coupled to the first rail section at 812 a pivot 830a. The second rail 820 optionally comprises a first rail section 822 and a second rail section 824 pivotally coupled to the first rail section 822 at a pivot 830b. The pivots 830a, 830b are optionally aligned along a common pivot axis which optionally extends transverse to the length of the rails 810, 820. First rail 810 and second rail 820 are optionally joined by one or more cross-supports 870 (e.g., beams or other structure).

Figure 11:
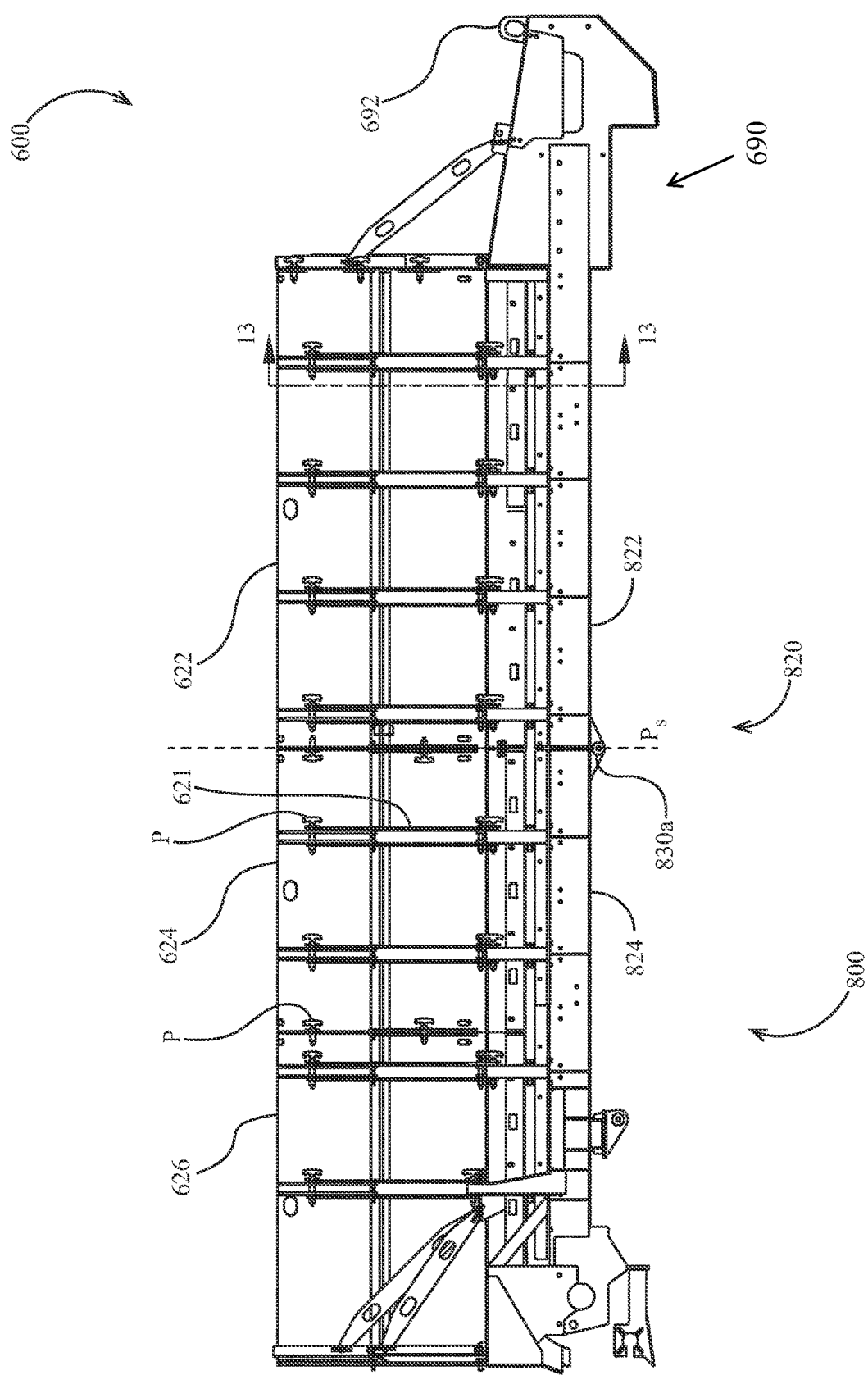
FIG. 11 is a side elevation view of the side conveyor of FIG. 8 in an operating configuration.
Figure 12:
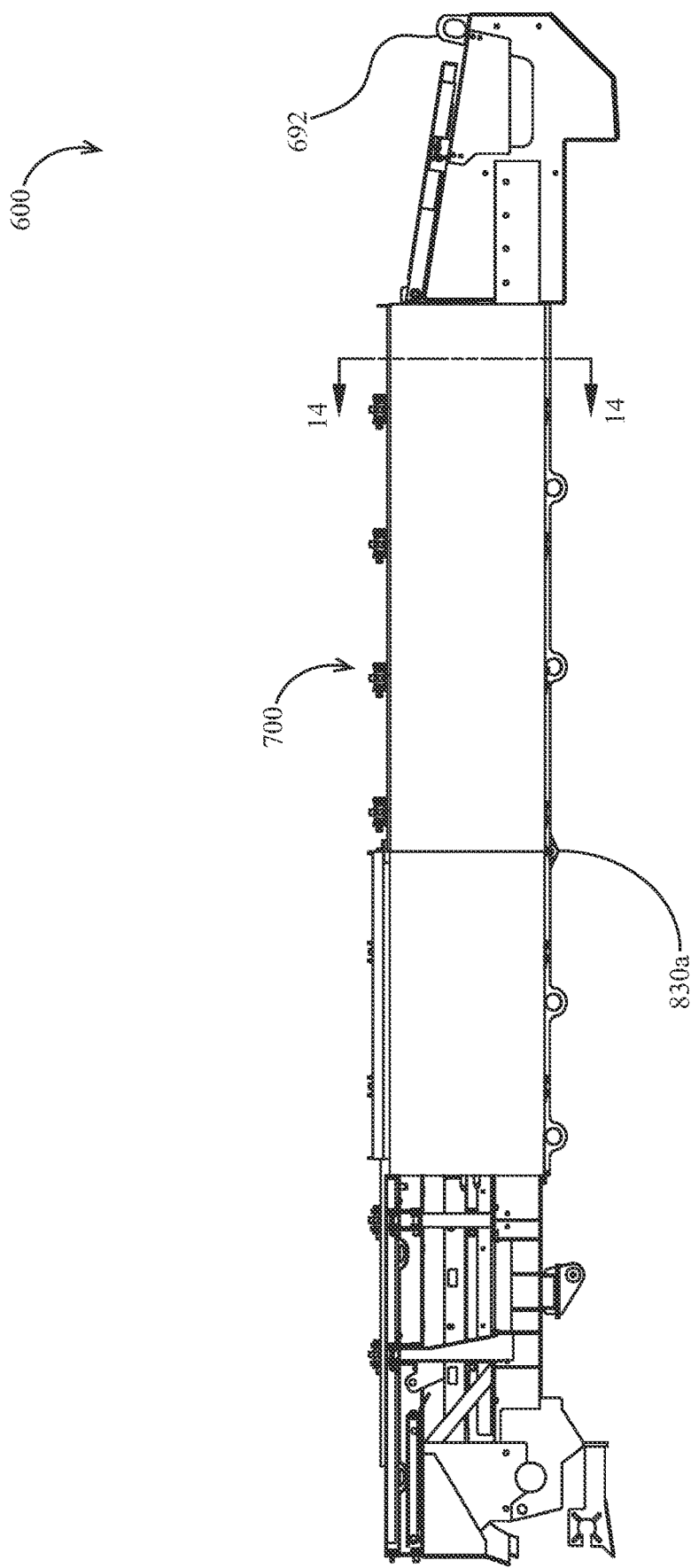
FIG. 12 is a side elevation view of the side conveyor of FIG. 8 in an intermediate configuration.

Referring to FIG. 11, a tail end 690 of the side conveyor 600 is optionally mounted to the frame 800 and configured to rest on the ground or other support (e.g., external frame, ramp, cribbing, etc.). One or more eyes 692 or other structure are optionally provided on the tail end 690 for folding and unfolding the frame 800. Individual sections of the backboard 620 are optionally separably joined (e.g., in the operational configuration) by one or more removable pins P. In some embodiments, the backboard 620 and/or wing extension are divided into sections along a plane $P_S$ that intersects the pivots 830a, 830b. The braces 621 are optionally separably joined (e.g., in the operational configuration) to the backboard 620 and/or the frame 800 by one or more removable pins P.

Figure 13:
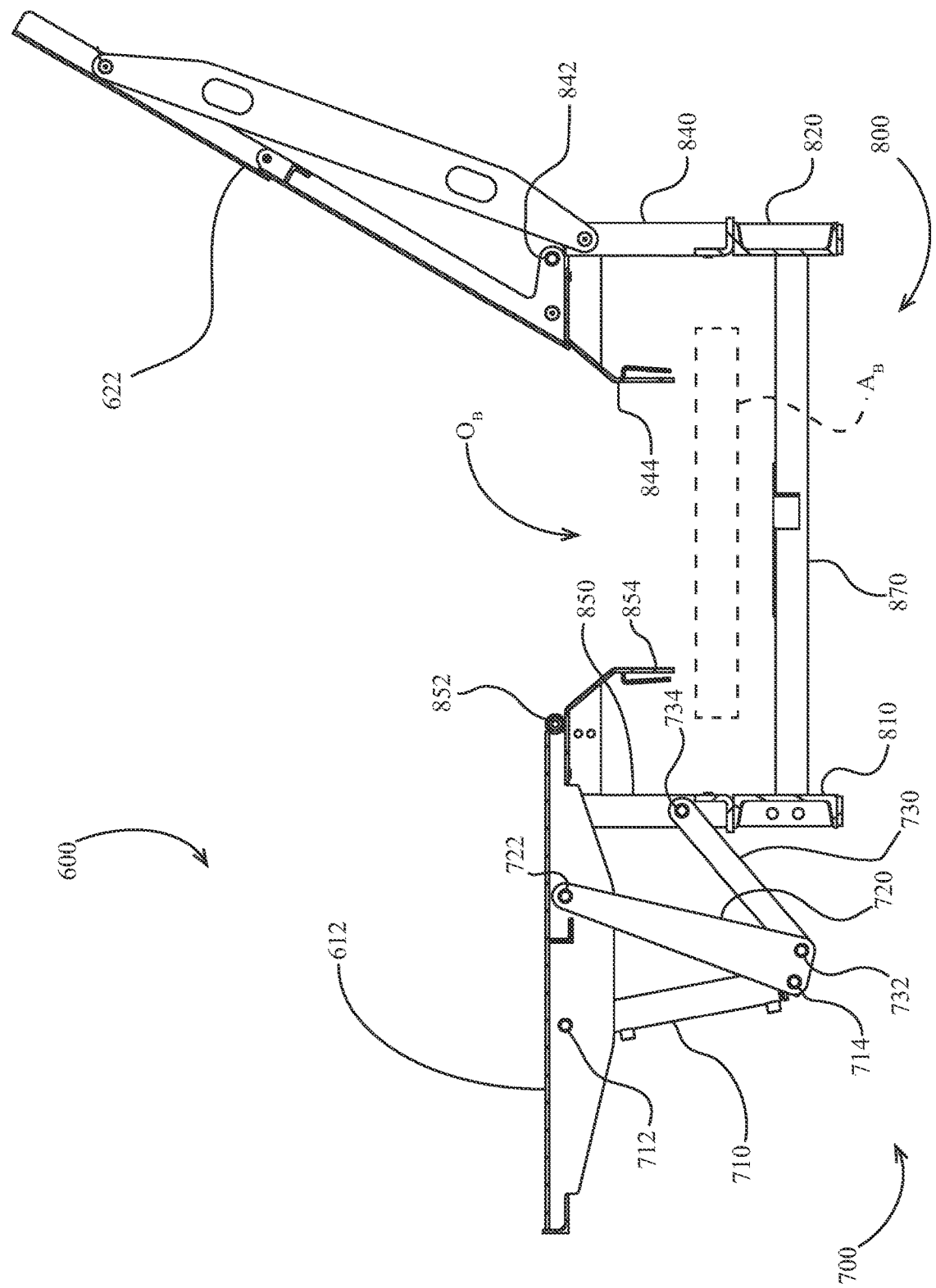
FIG. 13 is a sectional view along section 13-13 of FIG. 12.

Referring to FIG. 13, the side conveyor 600 is shown in an operational configuration. In the operational configurations of the side conveyor, the backboard 620 and wing extension 610 are optionally disposed to guide material into an opening $O_B$ disposed generally above a belt area $A_B$ in which a conveyor belt is optionally positioned to move material along the length of the side conveyor toward the center of the unloading conveyor system. The opening $O_B$ is optionally bounded on a first side by a wall 844 supported on a riser 840 mounted to rail 820. Backboard 620 is optionally pivotally coupled to riser 840 at one or more pivots 842. The opening $O_B$ is optionally bounded on a first side by a wall 854 supported on a riser 850 mounted to rail 810. Wing extension 610 is optionally pivotally coupled to riser 850 at one or more pivots 852.

Continuing to refer to FIG. 13, the linkage 700 is shown in a configuration in which the actuator 710 is in a relatively retracted state (e.g., less than 50% extended, less than 30% extended, less than 10% extended, etc.) and the wing extension is in a relatively extended position (e.g., folded generally away from the frame 800). The actuator 710 is optionally pivotally coupled (e.g., at a first end thereof) to wing extension 610 at a pivot 712. The actuator 710 is optionally pivotally coupled (e.g., at a second end thereof) to a link 720 (e.g., rigid link) at a first end of the link 720. The link 720 (e.g., the first end thereof) is optionally pivotally coupled to a link 730 at a pivot 732. The link 720 (e.g., a second end thereof) is optionally pivotally coupled to the wing extension 610 at a pivot 722. The link 730 is optionally pivotally coupled to the frame 800 (e.g., to riser 850) at a pivot 734.

Figure 14:
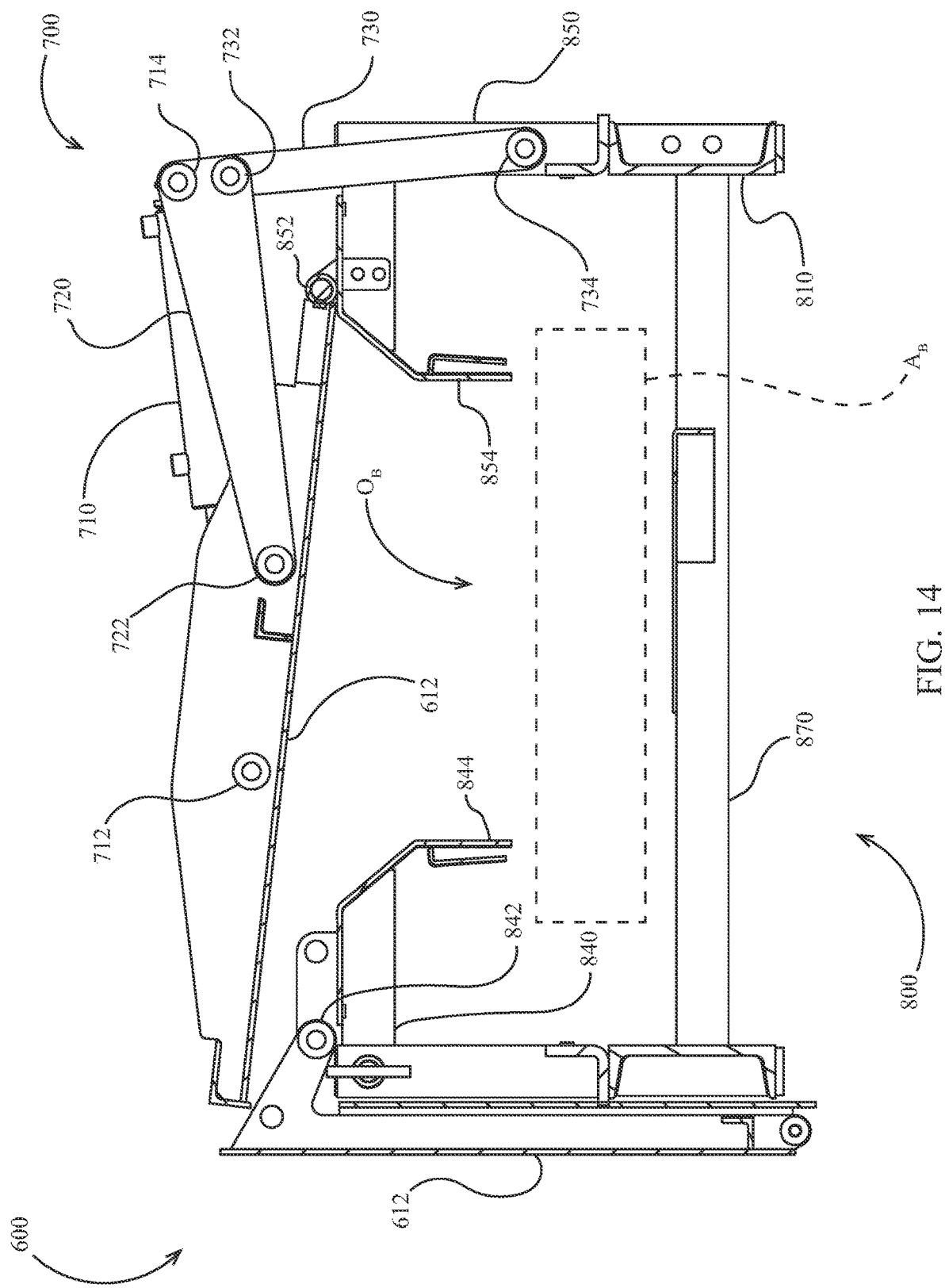
FIG. 14 is a sectional view along section 14-14 of FIG. 12.

Referring to FIG. 14, the linkage 700 is shown in a configuration in which the actuator 710 is in a relatively extended state (e.g., more than 50% extended, more than 70% extended, more than 90% extended, etc.) and the wing extension is in a relatively folded position (e.g., folded generally into the frame 800). It should be appreciated that linkage 700 enables a relatively large pivotal movement of wing extension 610 with a relatively small linear extension (or retraction) of actuator 710, e.g., compared to at least some alternative embodiments in which the actuator 710 directly couples the frame 800 to the wing extension 610.

In some embodiments, the head ends of a plurality of actuators 710 mounted to a single wing extension section (or the entire wing extension) are fluidly coupled such that the actuators extend simultaneously and/or synchronously. In some embodiments, the rod ends of a plurality of actuators 710 mounted to a single wing extension section (or the entire wing extension) are fluidly coupled such that the actuators retract simultaneously and/or synchronously.

Referring to FIGS. 15-17, a side conveyor system 1000 is illustrated comprising side conveyor 600 with an embodiment of a belt assembly 900 operably installed on the side conveyor. The belt assembly 900 optionally comprises an endless belt 920 supported on a head pulley 940 and tail pulley 910. Head pulley 940 is optionally driven by a motor 944 (e.g., via a belt assembly 942 or other device). The endless belt 920 is optionally supported on a plurality of idler assemblies 950 (e.g., troughing idler assemblies, straight idlers, etc.). The endless belt 920 is optionally supported at a lower side thereof by one or more return idlers 930. The idlers and pulleys of the belt assembly 900 are optionally supported on frame 800 of the side conveyor 600.

In some embodiments, the unloading systems described may be used alternately or simultaneously for unloading material onto one or more unloading conveyors both to the side of a truck (e.g., on side conveyors) or beneath or at the end of a truck (e.g., between ramps). In some embodiments, raising the ramps causes material deposited on the ramps to be gathered and deposited onto one or more unloading conveyors.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A method of operating and transporting a truck unloader, comprising:
    driving a side-dump truck containing aggregate material over a ramp assembly, the ramp assembly comprises a first ramp and a second ramp, each of the first ramp and the second ramp having a first side;
    depositing aggregate material from the side-dump truck laterally to a side conveyor system, wherein the side conveyor system comprises a first side conveyor and a second side conveyor, the first side conveyor and second side conveyor in a conveying configuration, the first side conveyor and the second side conveyor pivotable from the conveying configuration to a transport configuration, wherein the first side conveyor and the second side conveyor are disposed laterally on the first side of the first ramp and the first side of the second ramp;
    by said side conveyor system in the conveying configuration, conveying aggregate material from the side-dump truck to an unloading conveyor system, the unloading conveyor system comprising a first unloading conveyor disposed at least partially beneath the side conveyor system; and
    pivoting the first side conveyor and the second side conveyor from the conveying configuration to the transport configuration.

2. The method of claim 1, wherein the first ramp and the second ramp are each pivotally mounted to a frame for pivoting about respective first and second horizontal axes.

3. The method of claim 2, wherein at least one of the first ramp and the second ramp comprises a first portion and a second portion pivotally coupled to the first portion.

4. The method of claim 3, wherein at least one of the first ramp and the second ramp comprises a third portion pivotally coupled to the second portion.

5. The method of claim 1, wherein at least one of the first side conveyor and the second side conveyors comprises:
    a first conveyor frame supporting a first plurality of conveyor idler assemblies;
    a second conveyor frame supporting a second plurality of conveyor idler assemblies, said second conveyor frame pivotally connected to said first conveyor frame.

6. The method of claim 5, wherein said first conveyor frame supports a tail pulley, and wherein said second conveyor frame supports a motor-driven head pulley.

7. A method of operating and transporting a truck unloader, comprising:
    driving a side-dump truck containing aggregate material over a ramp assembly, the ramp assembly comprises a first ramp and a second ramp;
    depositing aggregate material from the side-dump truck laterally to a side conveyor system, wherein the side conveyor system comprises a first side conveyor and a second side conveyor, the first side conveyor and second side conveyor in a conveying configuration, the first side conveyor and the second side conveyor pivotable from the conveying configuration to a transport configuration, wherein the first side conveyor comprises:
        a first frame section;
        a first board pivotally coupled to the first frame section;
        a first plurality of linkages coupled to the first board and to the first frame section, each linkage comprising at least first, second and third links; and
        at least a first actuator operably coupled to one of the links of the first plurality of linkages and to one of the first board and the first frame section,
    by said side conveyor system in the conveying configuration, conveying aggregate material from the side-dump truck to an unloading conveyor system, the unloading conveyor system comprising a first unloading conveyor disposed at least partially beneath the side conveyor system; and
    pivoting the first side conveyor and the second side conveyor from the conveying configuration to the transport configuration.

8. The method of claim 7, wherein at least one of said first and second side conveyors comprises:
    a first conveyor frame supporting a first plurality of conveyor idler assemblies;
    a second conveyor frame supporting a second plurality of conveyor idler assemblies,
    said second conveyor frame pivotally connected to said first conveyor frame.

9. The method of claim 8, wherein said first conveyor frame supports a tail pulley, and wherein said second conveyor frame supports a motor-driven head pulley.

10. The method of claim 7, wherein the second side conveyor comprises:
    a second frame section;
    a second board pivotally coupled to said second frame section,
    a second plurality of linkages coupled to said second board and to said second frame section, each said linkage comprising first, second and third links;

at least a second actuator operably coupled to at least one of said second plurality of linkages and to one of said second board and said second frame section.

\* \* \* \* \*